(12) United States Patent
Wobben

(10) Patent No.: US 8,057,176 B2
(45) Date of Patent: Nov. 15, 2011

(54) DEVICE FOR MARKING A WIND POWER PLANT

(76) Inventor: Aloys Wobben, Aurich (DE)

( * ) Notice: Subject to any disclaimer, the term of this patent is extended or adjusted under 35 U.S.C. 154(b) by 888 days.

(21) Appl. No.: 11/662,755

(22) PCT Filed: Aug. 25, 2005

(86) PCT No.: PCT/EP2005/054177
§ 371 (c)(1),
(2), (4) Date: Apr. 8, 2008

(87) PCT Pub. No.: WO2006/029955
PCT Pub. Date: Mar. 23, 2006

(65) Prior Publication Data
US 2008/0282590 A1 Nov. 20, 2008

(30) Foreign Application Priority Data
Sep. 18, 2004 (DE) .......................... 10 2004 045 415

(51) Int. Cl.
*F03D 11/00* (2006.01)
(52) U.S. Cl. ......................................... 416/62
(58) Field of Classification Search .................. 416/62, 416/247 R, 247 A, 146 R, 224
See application file for complete search history.

(56) References Cited

U.S. PATENT DOCUMENTS

| | | | |
|---|---|---|---|
| 3,993,016 A | 11/1976 | Pulaski | 116/2 |
| 4,285,431 A | 8/1981 | Wickman | 206/522 |
| 5,273,399 A | 12/1993 | Ojeda | 416/146 R |
| 5,281,093 A | 1/1994 | Sedlak et al. | |
| 5,591,006 A * | 1/1997 | DeMeo et al. | 416/62 |
| 5,947,686 A | 9/1999 | Keyes | |
| 6,015,261 A * | 1/2000 | Barone | 416/62 |
| 6,623,243 B1 * | 9/2003 | Hodos | 416/61 |
| 6,835,045 B1 * | 12/2004 | Barbee et al. | 416/62 |
| 2003/0000562 A1 * | 1/2003 | Slabbert | 135/96 |
| 2005/0042102 A1 * | 2/2005 | Teichert | 416/146 R |

FOREIGN PATENT DOCUMENTS

| | | |
|---|---|---|
| DE | 199 50 620 C1 | 4/2001 |
| DE | 10160360 A1 | 6/2003 |
| DE | 202 12 352 U1 | 12/2003 |
| DE | 202004006595 U1 | 9/2004 |
| DE | 20 2004 016 460 U1 | 12/2004 |
| JP | 2003-512567 A | 4/2003 |
| WO | 03/104648 A1 | 12/2003 |
| ZA | 200307357 A * | 8/2004 |

OTHER PUBLICATIONS

Bundesministerium Für Verkehr, Bau- und Wohnungswesen: Nachrichten Für Luftfahrer, Bd. 1, Nr. 48, Dec.23, 1999.

* cited by examiner

*Primary Examiner* — Richard Edgar
(74) *Attorney, Agent, or Firm* — Seed IP Law Group PLLC

(57) ABSTRACT

The present invention concerns a wind power installation and in particular the identification of a wind power installation as an aviation obstruction. The object of the present invention is to provide a simple daytime identification which can be easily modified and which avoids the disadvantages of the blades identified by color marking. Apparatus for temporary signal identification of a wind power installation wherein the apparatus comprises a sheath which is of a predetermined colored configuration and also has releasable fixing means for releasably fixing the sheath to a rotor blade of the wind power installation, wherein during fixing the sheath at least partially encloses the rotor blade.

6 Claims, 2 Drawing Sheets

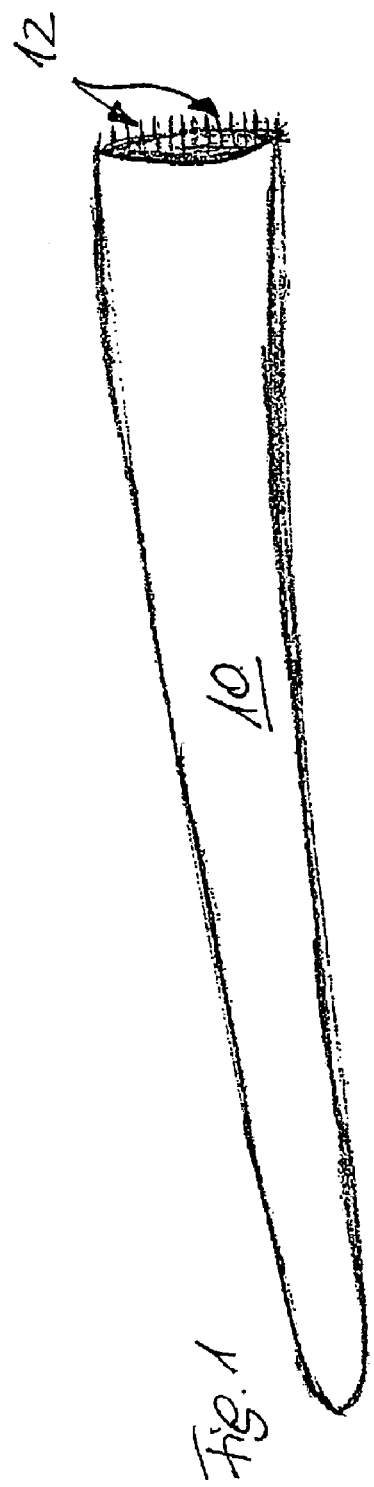
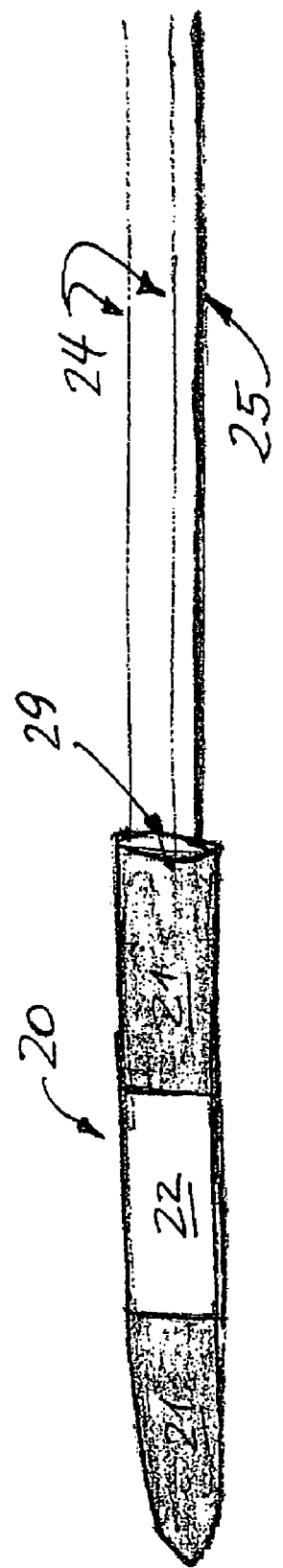

DEVICE FOR MARKING A WIND POWER PLANT

BACKGROUND OF THE INVENTION

1. Field of the Invention

The present invention concerns a wind power installation and in particular the identification of a wind power installation as an aviation obstruction.

2. Description of the Related Art

Such an identification has been previously described and is basically distinguished on the basis of daytime identification and nighttime identification. While nighttime identification is always lighting with red light, the daytime identification can be effected selectively with white light or alternatively with colored (red/white) markings on the rotor blade. Those color markings (signal markings) are usually red-white-red from the rotor blade tip and each of those portions must be of a length of about 6 meters or more, in accordance with the current construction requirements.

While the nighttime identification can be ensured with energy storage devices which are charged up during the day even during the building phase when the installation cannot yet be supplied with power from the mains network, that is possible for a daytime identification with white light, only with disproportionately high complication and expenditure. In addition however fitting blades identified in red-white-red would admittedly make a daytime identification with white light obsolete, but that signifies a considerable increase in expense in production of the rotor blades.

As general state of the art, reference is to be made to the documents DE 2004 006 595 U1 and DE 101 60 360 B4.

BRIEF SUMMARY OF THE INVENTION

The object of the present invention is to provide a simple daytime identification which can be easily modified and which avoids the disadvantages of the blades identified by color marking.

According to the invention that object is attained by an apparatus having the features of claim 1. Advantageous developments are set forth in the appendant claims.

The invention proposes a temporary color marking identification of the rotor blades of a wind power installation.

In that respect the invention is based on the realization that the daytime identification by colored marking of the rotor blades admittedly manages without electrical energy, but is only temporarily required. It is therefore sufficient for sheaths of a suitably colored configuration to be pulled over the rotor blades and for those sheaths to be removed again when the wind power installation is brought into operation or after production of the power supply for the wind power installation.

The sheath is preferably so designed that the colored configuration of the sheath already complies with the identification requirements for aviation obstructions.

In a preferred embodiment of the invention cables are used as fixing means, with which the spacing from the opening of the sheath to the rotor blade root can be bridged and which are of a sufficient length to permit secure fixing in the region of the rotor blade root or for example to the hub fairing.

By virtue of the edge of the opening of the sheath being of a particularly tear-resistant nature and by virtue of at least one particularly tear-resistant fixing means being fitted thereto, even in the event of failure of other fixing means, it is possible to prevent unwanted release of the sheath and thus to prevent it from uncontrolledly dropping off or blowing away with the loss of the sheath which that almost inevitably entails.

In a particularly preferred development of the invention the inside of the sheath is cushioned with a material which is softer than the rotor blade surface. That can reliably prevent the rotor blade surface from being damaged by the sheath. Furthermore the sheath can then already be pulled on to the rotor blade on the ground and can then already serve as a protective sheath when handling the rotor blade. In that case the sheath can be particularly reinforcedly cushioned in particular at the locations at which the rotor blade is carried for example by a crane.

For that purpose the sheath can particularly preferably substantially extend over the entire rotor blade length. By virtue thereof, fitting or removal of additional cushions prior to or after handling of the rotor blade can be avoided and thus the procedure can be simplified. That therefore affords adequate cushioning to protect the rotor blade from damage, for example by a crane harness.

As the outer end of the sheath, that is to say that part which is at the rotor blade tip, is still of a red color, the sheath can already be pulled on to the rotor blade prior to on-road transport and can thus serve as an additional or also required safeguard during transport. It will be appreciated that in that case the sheath can also have at its closed end one or more loops or other suitable holding means for receiving reflectors and/or lamps with which a projecting rotor blade end can be clearly marked during transport.

Advantageous developments of the invention are set forth in the appendant claims.

BRIEF DESCRIPTION OF THE SEVERAL VIEWS OF THE DRAWING(S)

The invention is described in greater detail hereinafter with reference to the Figures in which:

FIG. 1 shows a simplified view of a rotor blade,

FIG. 2 shows a simplified view of a first embodiment of a sheath according to the invention.

DETAILED DESCRIPTION OF THE INVENTION

Figure 3:
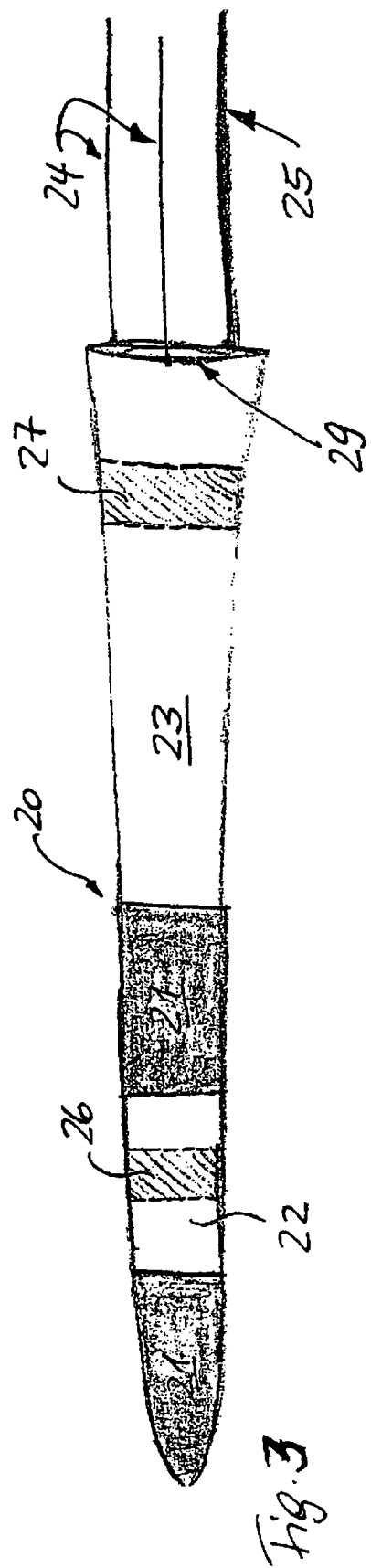
FIG. 3 shows a second embodiment of a sheath according to the invention.

In FIG. 1, the rotor blade 10 shown therein has at the left a rotor blade tip and at the opposite end fixing bolts 12. The rotor blade is fixed to the hub of the wind power installation with those fixing bolts 12.

FIG. 2 shows a sheath 20 according to the invention. Beginning at the rotor blade tip the sheath 20 has a red portion 21, a white portion 22 and once again a red portion 21. At the last-mentioned red portion 21 the sheath is open and fixing means in the form of cables 24, 25 are fitted to the edge 29 extending around the opening.

In order to be able to reliably fix the sheath 20 the cables 24, 25 are of such a length that they can bridge over the distance between the edge 29 of the sheath 20 and the rotor blade root and allow secure fixing. In that case one of the cables 25 can be strengthened and also the edge 29 of the opening of the sheath can be of a strengthened nature such that, even upon failure of the other cables 24, the sheath is always still held fast to the rotor blade and thus it is reliably prevented from uncontrolledly blowing away and possibly endangering the surrounding area.

FIG. 3 shows an alternative embodiment of the sheath 20 according to the invention. In this alternative embodiment, once again beginning at the rotor blade tip, there are a red portion 21, a white portion 22 and once again a red portion 21, which comply with the requirements for daytime identification, just as is the case with the first embodiment of the sheath 20 shown in FIG. 2.

In this second embodiment however, there is in adjoining relationship a further region 23 whose coloration is however not necessarily prescribed. That region 23 can be for example white but it can also be transparent. It can even be provided for example with a logo or another reference to the manufacturer of the wind power installation and/or the rotor blade.

It will be appreciated that the second embodiment of the sheath 20 is also open at one end and once again cables 24, 25 are fitted as securing means to the edge 29 of that open end, the cables permitting the sheath 20 to be fixed for example in the region of the rotor blade root to the hub or to the hub fairing.

It will be appreciated that the edge 29 can also once again be particularly reinforced and a particularly strong cable 25 can be provided in order reliably to prevent the sheath 20 from coming loose from the rotor blade even in the event of failure of the other cables 24.

This Figure shows a cushioning 26 in the white region 22 and a further cushioning 27 in the region 23 of the sheath 20. Those regions 26, 27 by way of example identify the particularly reinforced cushioning of the rotor blade sheath 20, which is greater and stronger than the complete internal cushioning (not shown) of the sheath 20. In this respect those reinforced regions 26, 27 are arranged in such a way that, when the sheath 20 is pulled on to the rotor blade, they are positioned precisely at the locations at which the rotor blade is lifted with a crane or at which the crane harness is placed around that blade for handling the rotor blade.

Accordingly the working operations which are necessarily required to protect the blade upon handling thereof, namely fitting or removing cushions to or from the rotor blade, can be eliminated and the working procedure is further rationalized.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. An apparatus for temporary signal identification of a wind power installation, the apparatus comprising:
   a sheath of a determined colored configuration, the sheath having an edge at an open end thereof and at least one attachment device fitted to the edge, and the sheath having cushions at locations of the sheath at which handling devices are fitted to the rotor blade for transport purposes; and
   cables for releasably fixing the sheath to a rotor blade of the wind power installation, the cables having a length sufficient to bridge over a distance from the open end of the sheath to a root of the rotor blade to permit fixing of the sheath to the rotor blade in the region of the root, and the sheath at least partially enclosing the rotor blade when the sheath is fixed to the rotor blade.

2. The apparatus according to claim 1 wherein the predetermined color configuration includes alternately red and white portions a predetermined length.

3. The apparatus according to claim 1 wherein the sheath includes a cushion inside of the sheath which is made of a material which is softer than a surface of the rotor blade.

4. The apparatus according to claim 1 wherein a length of the sheath substantially corresponds to a length of the rotor blade.

5. A wind power installation having an apparatus according to claim 1.

6. An apparatus for temporary signal identification of a wind power installation, the apparatus comprising:
   a sheath of a determined colored configuration having an open end, the sheath sized to at least partially enclose a rotor blade of the wind power installation when the sheath is attached to the rotor blade, and the sheath including a plurality of cushions positioned along a length thereof at locations of the sheath corresponding to areas for engagement by handling devices to transport the rotor blade; and
   cables for releasably attaching the sheath to the rotor blade, the cables having a length sufficient to bridge over a distance from the open end of the sheath to a root of the rotor blade.

* * * * *

UNITED STATES PATENT AND TRADEMARK OFFICE
CERTIFICATE OF CORRECTION

PATENT NO.        : 8,057,176 B2                                                Page 1 of 1
APPLICATION NO.   : 11/662755
DATED             : November 15, 2011
INVENTOR(S)       : Aloys Wobben It is certified that error appears in the above-identified patent and that said Letters Patent is hereby corrected as shown below:

Column 4, Line 22:
"white portions a predetermined length." should read, --white portions of a predetermined length.--.

Signed and Sealed this
Twentieth Day of March, 2012

David J. Kappos
*Director of the United States Patent and Trademark Office*